(12) United States Patent
Perry

(10) Patent No.: US 8,484,073 B2
(45) Date of Patent: Jul. 9, 2013

(54) METHOD OF DISTRIBUTING TARGETED INTERNET ADVERTISEMENTS

(75) Inventor: Morgan Perry, Brier, WA (US)

(73) Assignee: Facebook, Inc., Menlo Park, CA (US)

( * ) Notice: Subject to any disclaimer, the term of this patent is extended or adjusted under 35 U.S.C. 154(b) by 2125 days.

(21) Appl. No.: 10/423,512

(22) Filed: Apr. 25, 2003

(65) Prior Publication Data

US 2004/0215509 A1 Oct. 28, 2004

(51) Int. Cl.
*G06Q 30/00* (2012.01)

(52) U.S. Cl.
USPC .......................................................... 705/14

(58) Field of Classification Search
USPC .................................................... 705/10, 14
See application file for complete search history.

(56) References Cited

U.S. PATENT DOCUMENTS

| | | | |
|---|---|---|---|
| 5,848,396 A * | 12/1998 | Gerace | 705/10 |
| 6,151,624 A | 11/2000 | Teare et al. | |
| 6,826,559 B1 | 11/2004 | Ponte | |
| 7,007,074 B2 | 2/2006 | Radwin | |
| 7,039,599 B2 | 5/2006 | Merriman et al. | |
| 7,050,989 B1 | 5/2006 | Hurt et al. | |
| 7,181,488 B2 * | 2/2007 | Martin et al. | 709/200 |
| 2001/0039515 A1 | 11/2001 | Mayadas | |
| 2001/0042002 A1 | 11/2001 | Koopersmith | |
| 2002/0002552 A1 | 1/2002 | Schultz et al. | |
| 2002/0046085 A1 * | 4/2002 | Rochon et al. | 705/14 |
| 2002/0049635 A1 | 4/2002 | Mai et al. | |
| 2002/0072970 A1 | 6/2002 | Miller et al. | |
| 2002/0073008 A1 * | 6/2002 | Dutta et al. | 705/37 |
| 2002/0099600 A1 | 7/2002 | Merriman et al. | |
| 2002/0100041 A1 | 7/2002 | Rosenberg et al. | |
| 2002/0133397 A1 * | 9/2002 | Wilkins | 705/14 |
| 2002/0152126 A1 | 10/2002 | Lieu et al. | |
| 2003/0004810 A1 * | 1/2003 | Eldering | 705/14 |
| 2003/0004901 A1 * | 1/2003 | Dutta et al. | 705/402 |
| 2003/0023481 A1 * | 1/2003 | Calvert et al. | 705/14 |
| 2003/0046281 A1 | 3/2003 | Son | |
| 2004/0008313 A1 | 1/2004 | Park et al. | |
| 2004/0082133 A1 * | 4/2004 | Salling et al. | 438/301 |
| 2004/0083133 A1 | 4/2004 | Nicholas et al. | |
| 2004/0117248 A1 * | 6/2004 | Dutta et al. | 705/14 |
| 2004/0215509 A1 | 10/2004 | Perry | |
| 2004/0215515 A1 | 10/2004 | Perry | |
| 2004/0249709 A1 | 12/2004 | Donovan et al. | |

OTHER PUBLICATIONS

U.S. Appl. No. 11/354,209, filed Feb. 14, 2006, Case.
U.S. NonFinal Office Action dated Sep. 20, 2007 under U.S. Appl. No. 10/759,553, 78 pages.
U.S. Final Office Action dated Apr. 9, 2008 under U.S. Appl. No. 10/759,553, 10 pages.
U.S. NonFinal Office Action dated Oct. 1, 2007 under U.S. Appl. No. 11/354,209, 21 pages.
U.S. Final Office Action dated Mar. 21, 2008 under U.S. Appl. No. 11/354,209, 18 pages.

* cited by examiner

*Primary Examiner* — Saba Dagnew
(74) *Attorney, Agent, or Firm* — Fenwick & West LLP

(57) ABSTRACT

A method of distributing Internet advertisements at the websites of a number of different publishers operating web sites. An advertising entity collects lists of user identifiers from each of several advertisers. In response to a user visiting one of the websites, the user identifier associated with the user is determined. It is determined if the user identifier is on one of the list. If the user identifier is on a list, an unembedded advertisement associated with the advertiser whose list contains the user's identifier is served to the user. The advertisement may be a pop-up, pop-under, or dynamic html advertisement, and if the user is not on the list, no such an ad may not be served.

29 Claims, 2 Drawing Sheets

METHOD OF DISTRIBUTING TARGETED INTERNET ADVERTISEMENTS

FIELD

This application relates to Internet communications, and more particularly to the distribution of advertisements.

BACKGROUND

The Internet is an effective tool for commercial communication. Companies electronically communicate with consumers to cost-effectively promote their goods or services. Normally, an Advertising Service Company (ASC) contracts with web publishers who have advertising placement space (such as banner ads), and with advertisers, such as Internet retailers. For example, a user browsing the Internet World Wide Web may click on a banner ad, which will lead the user to the advertiser's retail website. This is known as third-party ad-serving, and is one environment in which the preferred embodiment of the invention may operate.

When a user visits a website, a unique identifier (e.g. cookie) associated with the computer or other device employed by the user is written to the user's computer hard drive by the advertising service company, and information about the visit is stored in the company's database. The recorded information may include logging the interaction with the user's cookie anytime he/she views an advertisement, clicks an advertisement, or visits a page on an advertiser's site, where an "action tag" is loaded to capture the interaction. The cookie interactions are used to tie transactions on the advertiser's site to interactions (views and clicks) with advertisements. The cookie interaction is logged whenever an impression of an advertisement is served, whenever a user clicks on the advertisement, or whenever the user undertakes any of a wide variety of actions including page views, commercial transactions, provision of information such as an email address for future communications, and any other activity desired by the advertiser. For purposes of this discussion, all of these activities are considered to be "actions," as contrasted with "impressions" of advertisements served, but not acted upon.

In conventional Internet advertising approaches, advertisements are served by placement. Advertisers (or the service companies that assist and represent them) must determine which web sites, publishers, and placements provide the best-suited demographic, psychographic, or behavioral segment to reach with advertisements. Of course, as with any broadcast form of advertising, many of those who receive the advertisement will not be of the desired demographic, psychographic, or behavioral segment. Nonetheless, even slight differences among sites is enough to lead an advertiser to prefer one site over another. A problem with this approach is that pricing is based on the number of ads served, even if served to those who are not likely to respond positively to the ads.

Another problem is that users face advertisements that are of no interest, are distracting, and convey no relevant information, making the Internet relatively less appealing than other forms of information gathering, entertainment, or shopping. When a user receives an ad that is of interest, his browsing experience is enhanced, and he is more likely to return to the publisher's site in the future. Thus, publishers are more interested in offering advertising space to advertisers their visitors most value (or least object to, or find most relevant).

Even with the best available information about a web site's demographics, advertisements must be displayed to many users unlikely to respond, in order to reach a user of a demographic, psychographic, or behavioral segment likely to respond. Bulk email transmissions provide a much more targeted approach, but with significant disadvantages. A list of known prospects (such as the group of people who subscribe to a particular magazine, or who have purchased particular goods) can form the basis for a targeted email solicitation. While effective in some circumstances, these have several disadvantages. Commercial emails may be filtered by the recipients' software, received messages may be viewed as a distraction when they arrive at the wrong time of day, and excess commercial email may be generally unwanted by many users.

Other systems may use databases of information that associate user cookies with other information that helps to establish which users are the best prospects for particular advertisements. A problem with these and related systems is that only a minor fraction of users are associated with useful information. Thus, even though a particular advertisement might be served to all users whose cookies are associated with membership in a particular organization, or subscription to a particular magazine, such users are probably only a small minority of all of those to visit a given publisher's site. Accordingly, even if an advertiser would be willing to pay a premium to reach those users with a given advertisement, the cost of the advertisement would be expensive because even the users not in the desired demographic, psychographic, or behavioral segment would need to be served advertisements. Even if the advertiser arranged only to serve a targeted advertisement to the particular selected users, and the remaining visitors were served a different advertisement in the same place, the small number of targeted advertisements served (even at a higher price per ad) would likely be so small (perhaps only 5% or less) that the transaction would be of little interest to the publisher.

In addition, publishers would be understandably reluctant to have advertising served only to selected visitors, because this would leave blank space in the ad placement space (or random ads or other filler material.) To provide enough revenue, the publisher would need to devote a larger portion of a web page to the advertisements, which would reduce desired content.

SUMMARY

The present invention overcomes the limitations of the prior art by providing a method of distributing Internet advertisements at the websites of a number of different publishers operating web sites. An advertising entity collects lists of user identifiers from each of several advertisers. These lists could be generated in a number of ways, including, but not limited to, geography, demographics such as age and income, behaviors such as visiting web sites, registering for services or making purchases, searching or shopping for specific content on the Internet, using a specific computer operating system or web browser, or employment in a firm of a specific standard industrial classification. In response to a user visiting one of the publisher websites, the user identifier associated with the user is determined. It is determined if the user identifier is on one of the lists. If the user identifier is on a list, an unembedded advertisement associated with the advertiser whose list contains the user's identifier is served to the user. The advertisement may be a pop-up, pop-under, or dynamic html advertisement, and if the user is not on the list, such an ad is not served. In the case of the ad not being served, the request may or may not be returned to the publisher for placement of an ad by the publisher or its agent(s). In an alternate embodiment, the advertisement may be an embedded placement, such as the common 468×60 banner placement ("banner" will hereinafter refer to any and all embedded placements including, but not limited to standard Internet Advertising Bureau ad units such as 468×60s, 234×60s, 120×90s, 120×60s, 120×600s, 728×90s, 125×125s and 250×250s). In such an embodiment, the act of not serving an ad is associated with returning the initial ad request to the publisher for the publisher or its agent(s) to fill the embedded placement.

DETAILED DESCRIPTION OF A PREFERRED EMBODIMENT

Figure 1:
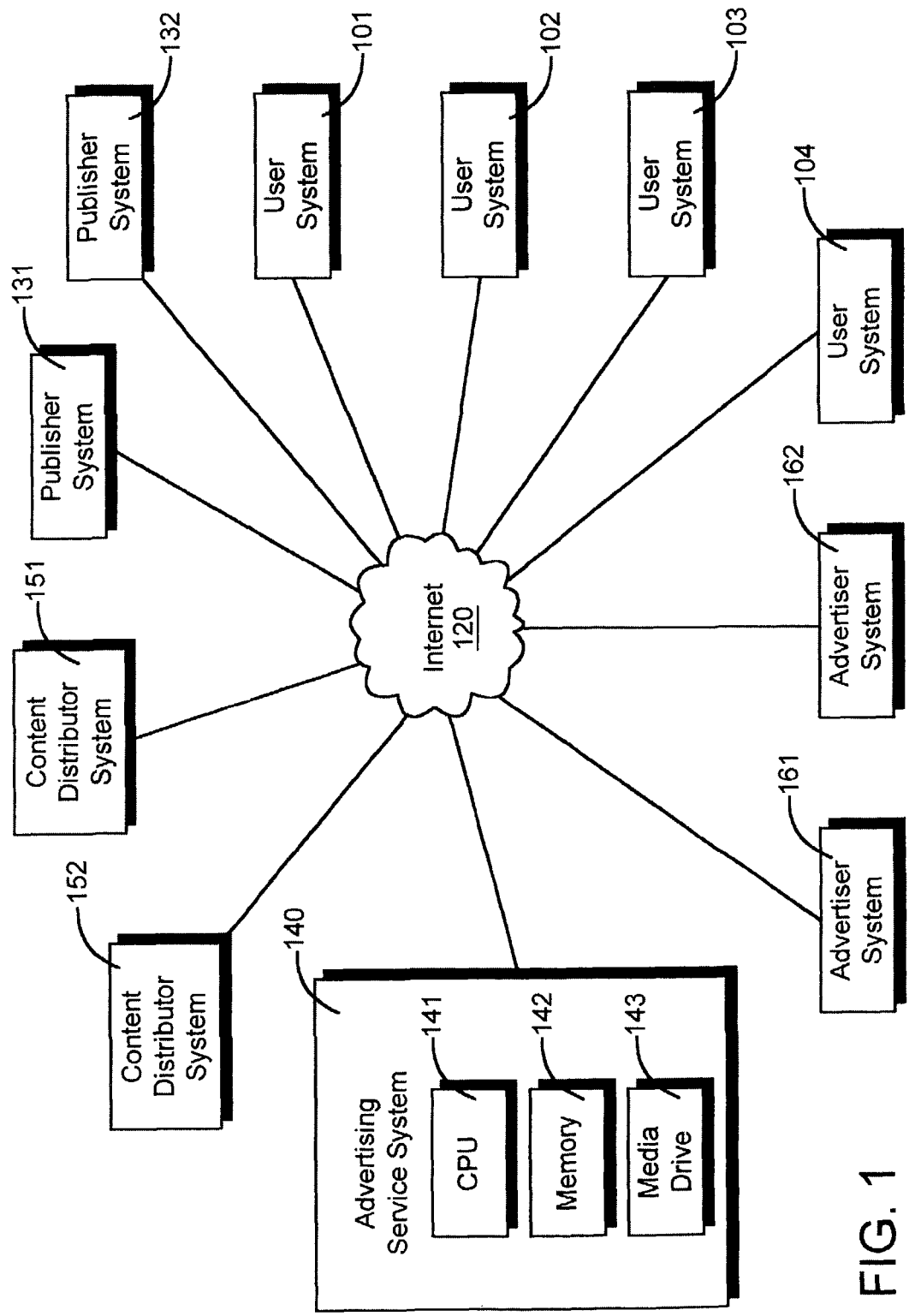
FIG. 1 is a schematic block diagram showing the system and environment in which a preferred embodiment of the invention operates.

FIG. 1 is a high-level block diagram showing the environment in which the facility preferably operates. The diagram shows a number of Internet customer or user computer systems 101-104. An Internet customer preferably uses one such Internet customer computer system to connect, via the Internet 120, to an Internet publisher computer system, such as Internet publisher computer systems 131 and 132, to retrieve and display a Web page. This is generally referred to "web browsing," and may include non-commercial activity as well as commercial activity such as retail purchases. An Advertising Service Company (ASC) 140 (or third-party ad server), advertisers 161, 162, and content distributors 151, 152 communicate via the Internet to serve advertisements placed on publisher web sites to users visiting those sites, in the manner discussed below.

Although discussed in terms of the Internet, this disclosure and the claims that follow use the term "Internet" to include not just personal computers, but all other electronic devices having the capability to interface with the Internet or other computer networks, including portable computers, telephones, televisions, appliances, electronic kiosks, and personal data assistants, whether connected by telephone, cable, optical means, or other wired or wireless modes including but not limited to cellular, satellite, and other long and short range modes for communication over long distances or within limited areas and facilities.

In cases where an Internet advertiser, through the ASC, has purchased advertising space on one of several Web pages provided to the Internet customer computer system by one of the Internet publisher computer systems, the Web page contains a reference to a URL in the domain of the Internet advertising service company computer system 140. (In the preferred embodiment discussed below, the advertiser does not select a specific space, but grants the ASC the power to control which publishers' sites will generate the greatest desired effect.) When a customer computer system receives a Web page that contains such a reference, the Internet customer computer systems sends a request to the ASC computer system to return data comprising an advertising message, such as a banner advertising message.

When the ASC computer system receives such a request, it selects an advertising message to transmit to the Internet customer computer system in response the request, and either itself transmits the selected advertising message or redirects the request containing an identification of the selected advertising message to an Internet content distributor computer system, such as Internet content distributor computer systems 151 and 152.

When the Internet customer computer system receives the selected advertising message, the Internet customer computer system displays it within the Web page. The Internet advertising service is not limited to banner advertisements, which are used as an example. Other Internet advertising modes include email messages directed to a user who has provided his or her email address in a request for such messages. Alternatively, instead of the third-party ad-serving model discussed above, the preferred embodiment may operate without an ASC, with the publisher serving its own ads and performing the actions that are normally performed by the ASC in the third-party model.

The displayed advertising message preferably includes one or more links to Web pages of the pertinent Internet advertiser's Web site. When the Internet customer selects or "clicks" one of these links in the advertising message, the Internet customer computer system uses the link to retrieve the Web page from the appropriate Internet advertiser computer system, such as Internet advertiser computer system 161 or 162. In visiting the Internet advertiser's Web site, the Internet customer may traverse several pages, and may take such actions as purchasing an item or bidding in an auction.

The Internet advertising service computer system 140 preferably includes one or more central processing units (CPUs) 141 for executing computer programs such as the facility, a computer memory 142 for storing programs and data, and a computer-readable media drive 143, such as a CD-ROM drive, for reading programs and data stored on a computer-readable medium.

While preferred embodiments are described in terms of the environment described above, those skilled in the art will appreciate that the facility may be implemented in a variety of other environments, including a single, monolithic computer system, as well as various other combinations of computer systems or similar devices.

The preferred embodiment of the invention operates to serve pop-up or other unembedded ads only to selected visitors to a web page who are identified as being members of a target list. Unembedded ads are distinguished from conventional banner ads that hold a reserved placement location on a web page, and include pop-ups and pop-unders, in which a new browser window containing the ad is opened, as well as floating ads, employing dynamic html, which temporarily overlay the page content. The term "pop-up" is used herein as a general term intended to encompass all unembedded advertisement types. An alternative embodiment involves the same approach with banner placements being served only if the user matches a key segment list held by the ASC. If not, the alternative embodiment returns the ad request to the publisher site to be fulfilled by the publisher or its agent(s). The system operates over any number of publisher web sites, and serves any number of advertisements from any number of advertisers.

Figure 2:
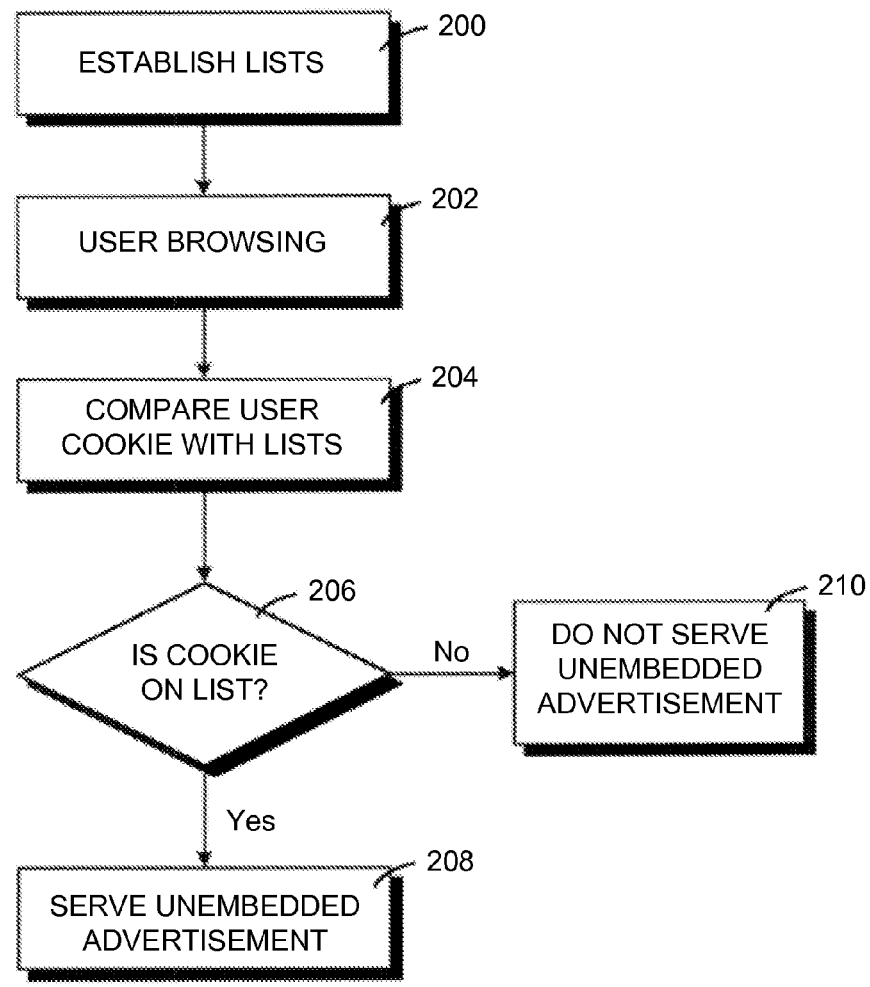
FIG. 2 is a flow chart illustrating operation of the invention.

As shown in FIG. 2, the preferred embodiment operates by the generation or establishment of databases or lists of user cookies (i.e. unique device identifiers) in step 200. Each list corresponds to a group of selected users who are to be targeted by a given advertisement or advertising campaign. In the preferred embodiment, the ASC collects the lists, so that ads from the advertisers may be served on the various web sites at which the ACS has arranged on behalf of the advertisers to purchase advertising display services. The lists may originate from any source.

In step 202, a user visits a web page of a publisher that has arranged with the ASC for the preferred embodiment service. A code on the page is served to the user, and causes the user's computer to communicate with the ASC, in the manner of conventional Internet advertisement service. In the process, the ASC determines a unique identifier (cookie) associated with the user's computer or other browsing device. In step 204, the ASC searches the lists in real time to determine (in step 206) if the cookie is on any of the lists. If the cookie is on a list, the ASC serves an unembedded advertisement associated with that list to the user in step 208. The served advertisement does not occupy the page that the user was seeking, and thus the sought page is displayed in the same form whether or not the user was on a list (although a dynamic html message may overlay the page). Alternatively, if the ad placement is an embedded placement and the cookie is not on a list, the ad request is returned to the publisher to fulfill.

If the user is on more than one list, there are several alternatives. The user may be served an ad associated with the first list entry, so that the ad is served quickly, and further searching is not needed. In this approach, the order in which lists are searched could be rotated or randomized to avoid bias in favor one any one particular list. Alternatively, when a user is on multiple lists, the ad to be served may be selected at random or by rotation (on subsequent visits to any affiliated publisher's site, and user would receive a different advertisement.) Alternatively, the user may receive multiple pop-ups (or other unembedded ads), because multiple windows can be opened at once, so that the user receives all pertinent ads of interest. Alternatively, the ad served could be won or lost through a bid system in which the advertiser that was willing to pay most for messaging to a list won all or most of the list.

If the user is not on any list, the publisher's page is displayed normally, with no unembedded advertisements, as in step 210, or with an embedded ad request returned to the publisher and fulfilled through the publisher or its agent(s). Unembedded ads that would have been served due to other arrangements may be served, but no unembedded ads are served on behalf of the ASC and/or its advertiser clients.

The system has the advantage of not serving advertisements to those who are unlikely prospects. Thus, each ad service is much more valuable to the advertiser. This works toward the goal of offering each user only relevant advertisements, and is a way to efficiently reach a niche audience.

Because any one list/advertisement may apply to only a tiny fraction of users, perhaps well less than 1%, there is an important advantage in the ASC accumulating different advertisers and advertisements, to aggregate the targeted audience to a more significant percentage of the total number of users who visit a given site. This aggregate amount may still be a minor percentage of user site visits, and there is thus an advantage to having the ASC conducting the process. This advantage flows from the fact that the ASC may be serving conventional advertisements for the various publishers under conventional terms. The service of an occasional high value pop-up advertisement to the user who is on a target list is essentially "icing" on the "cake" that justifies the arrangements between the ASC and publishers as well as being an strong inducement for more advertisers to take advantage of the targeting capabilities being offered through the site. Similarly, the ASC may arrange with advertisers for conventional advertising service, and offer the targeted pop-up ads as an additional service.

Even though the majority of users may not receive advertisements under this system, no party is any worse off, because the publisher did not need to reserve advertising space on its page, which would then go blank or be filled by a low-value message. The unlisted user simply does not receive a pop-up ad and/or receives an ad placement provided by the publisher.

This system and method is particularly well-suited for business-to-business transactions. For instance, industrial purchasing agents might be a very low percentage of Internet users, and conventional ads for industrial goods would be wasted on the vast majority of users. However, the service of a single ad to such an agent would be much more valuable than an ad that needlessly reaches a multitude of typical Internet users, especially since such an agent may have the means to avoid commercial emails.

To avoid inundating targeted individuals with pop-up or other ads every time they visit publishers with such arrangements, the frequency of service can be controlled by day, site, and campaign. This prevents the user from receiving more than a certain number of ads per time period, or site, and avoids over-saturating the user with ads from a single campaign. By recording which ads are served to which users to ensure this control, other features may be provided, such as sequencing different advertisements in a single campaign.

The system may also employ novel arrangements for obtaining and financing the lists. For instance, the original list owner (such as a magazine publisher) may be offered the opportunity to profit from use of the list, by receiving a share of the revenue generated by the process.

While the above is discussed in terms of preferred and alternative embodiments, the invention is not intended to be so limited.

The invention claimed is:

1. A method in a computing system having a processor for distributing Internet advertisements to users, each associated with a unique identifier, the method comprising:
  receiving unique identifiers from at least one of a plurality of advertisers, each unique identifier corresponding to a user, wherein none of the received unique identifiers is received from the user to whom the user identifier corresponds;
  storing each of the received unique identifiers in a database in association with the advertiser that provided the unique identifier;
  with a processor, in response to a user visiting a publisher website, automatically performing the following acts:
    determining the user's unique identifier;
    determining whether the unique identifier is in the database;
    in response to determining that the unique identifier is in the database, automatically performing the following acts:
      triggering a web browsing device associated with the user to open a new browser window;
      determining which of the plurality of advertisers provided the unique identifier;
      selecting an advertisement associated with an advertiser that provided the unique identifier; and
      displaying the selected advertisement in the new browser window.

2. The method of claim 1 wherein the database includes information associated with a plurality of different advertisements, and including the step of determining if the unique identifier is associated with any of the advertisements.

3. The method of claim 1 including providing a plurality of different databases, each containing a plurality of unique identifiers, and each database associated with a different advertisement.

4. The method of claim 3 including triggering a web browsing device associated with the user to open a new browser window if the user's unique identifier is in any of the databases and displaying a selected advertisement associated with the database.

5. The method of claim 3 wherein the databases are associated with different advertisers.

6. The method of claim 3 including a third party maintaining the databases for a plurality of different advertisers.

7. The method of claim 1 including, in response to a determination that the unique identifier is not in the database, refraining from triggering the opening of a new browser window.

8. The method of claim 1 including, in response to a determination that the unique identifier is not in the database, opening a new browser window and serving a different advertisement not associated with the selected advertisement.

9. An Internet advertisement distribution computer system comprising:
 a first database containing a plurality of unique identifiers each associated with a different user and provided by a first advertiser;
 a second database containing a plurality of unique identifiers each associated with a different user and provided by a second advertiser;
 the computer system being operable to determine, in response to web browsing activity of a particular user at a publisher website, whether the first database or the second database contains a unique identifier associated with the particular user;
 the computer system being operable, if the first database contains the associated identifier, to serve to the user an advertisement associated with the first advertiser;
 the computer system being operable, if the second database contains the associated identifier, to serve to the user an advertisement associated with the second advertiser; and
 the computer system being operable, if neither the first database nor the second database contain the associated identifier, to forward an advertisement request to the publisher website to be fulfilled by the publisher, or its agents, and not by the Internet advertisement distribution computer.

10. The computer system of claim 9 wherein the database includes information associated with a plurality of different advertisers, and wherein the computer system is operable to determine if the user's identifier is associated with either of the advertisers.

11. The computer system of claim 9 including a plurality of different databases, each containing a plurality of unique identifiers, and each database associated with a different advertiser.

12. The computer system of claim 11 wherein the databases are associated with different advertisements.

13. The computer system of claim 11 including a third party maintaining the databases for a plurality of different advertisers.

14. The computer system of claim 9 wherein the computer system is operable to not display an advertisement in response to web browsing activity if the unique identifier is not in the database.

15. The computer system of claim 9 wherein the advertisement is a pop-up advertisement in a new browser window or a banner.

16. The computer system of claim 9 wherein the advertisement is a floating advertisement.

17. The computer system of claim 9 wherein the computer system is operable in response to web browsing activity of the user over a plurality of different websites.

18. A method in a computing system having a processor for distributing Internet advertisements at the websites of a plurality of selected publishers comprising:
 an advertising entity collecting a list containing multiple user identifiers from each of several advertisers;
 with a processor, in response to a user visiting one of the websites, determining the user identifier associated with the user;
 determining if the user identifier is on a list collected from an advertiser; and
 if the user identifier is on a list collected from an advertiser, serving to the user an advertisement selected from a group of advertisements including banner and unembedded advertisements, the advertisement being associated with the advertiser whose list contains the user's identifier.

19. The method of claim 18 wherein the advertisement is selected from the group of advertising types comprising banners, pop-ups, pop-unders, and dynamic html advertisements.

20. The method of claim 18 including if the user identifier is not on any of the lists, refraining from serving an unembedded advertisement and/or redirecting the ad request back to the publisher for fulfillment.

21. A method in a computing system having a processor for distributing Internet advertisements to users, each associated with a unique identifier, the method comprising:
 providing a database of the unique identifiers;
 in response to an ad request arising when a user visits a publisher website, automatically performing the following acts:
  determining the user's unique identifier;
  in response to determining that the unique identifier is in the database, fulfilling the ad request by automatically triggering serving a banner ad without returning the ad request to the publisher to fulfill; and
  if the unique identifier is not in the database, returning the ad request to the publisher to fulfill.

22. The method of claim 21 wherein the database includes information associated with a plurality of different advertisements, and including the step of determining if the unique identifier is associated with any of the advertisements.

23. The method of claim 21 including providing a plurality of different databases, each containing a plurality of unique identifiers, and each database associated with a different advertisement.

24. The method of claim 23 including displaying a selected banner advertisement associated with the database if the user's unique identifier is in any of the databases.

25. The method of claim 23 wherein the databases are associated with different advertisers.

26. The method of claim 23 including a third party maintaining the databases for a plurality of different advertisers.

27. The method of claim 21 including, in response to a determination that the unique identifier is not in the database, serving a different advertisement not associated with the selected advertisement.

28. The method of claim 1 wherein determining the user's unique identifier is done automatically based on a cookie.

29. The method of claim 1 wherein the publisher is not one of the plurality of advertisers.

* * * * *